INVENTORS,
RALPH L. BAUER
TREVOR O. DAVIDSON
BY John Adam Terry
ATTORNEY

INVENTORS,
RALPH L. BAUER
TREVOR O. DAVIDSON
BY *John Adams Thuring*
ATTORNEY

*INVENTORS,*

RALPH L. BAUER
TREVOR O. DAVIDSON
BY
ATTORNEY

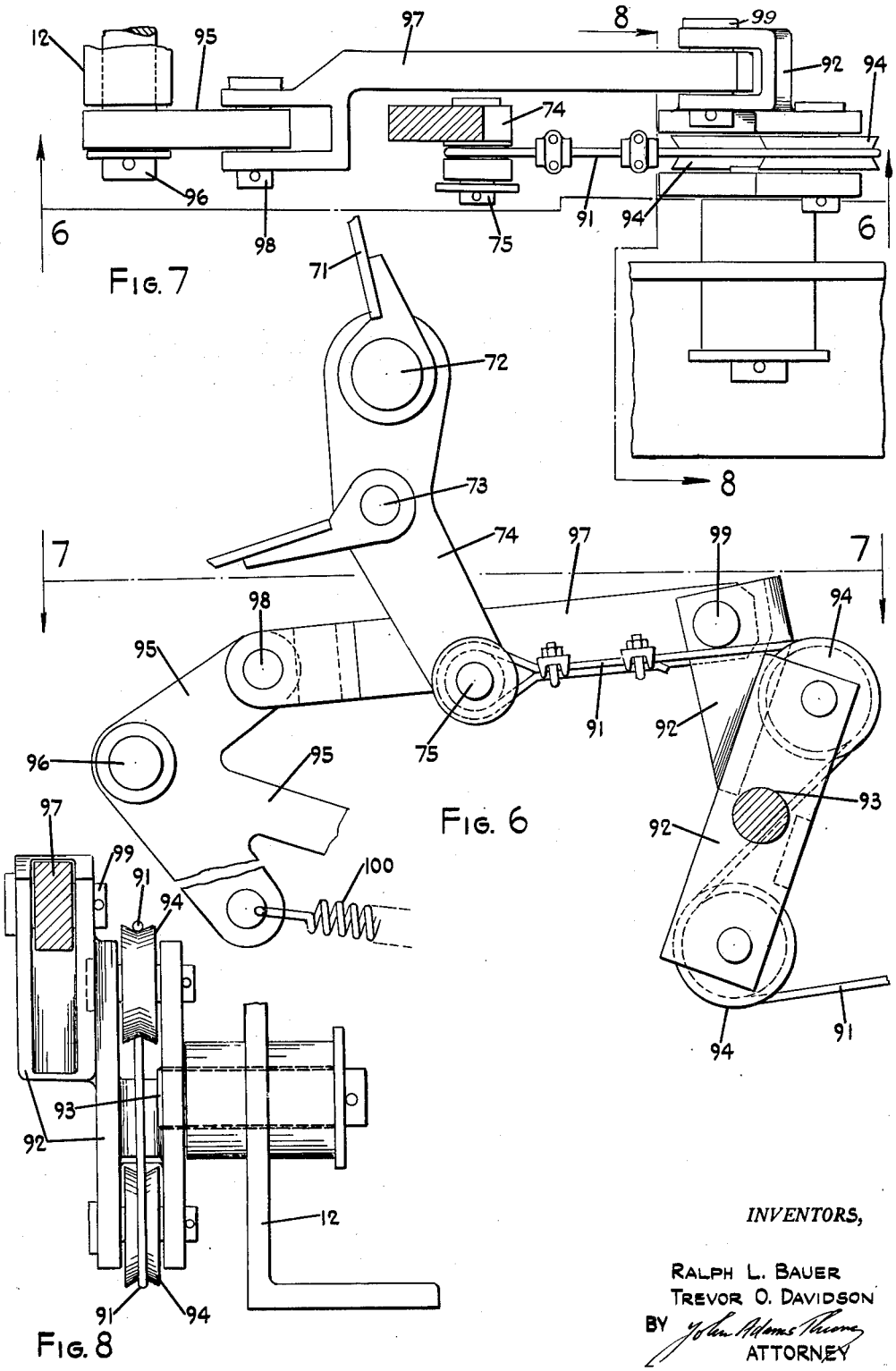

United States Patent Office 3,037,649
Patented June 5, 1962

3,037,649
ROPE-THRUST POWER SHOVEL
Ralph L. Bauer and Trevor O. Davidson, Milwaukee, Wis., assignors to Bucyrus-Erie Company, South Milwaukee, Wis., a corporation of Delaware
Filed Jan. 31, 1958, Ser. No. 712,405
2 Claims. (Cl. 214—135)

This invention relates to new and useful improvements in rope-thrust power shovels, more particularly power shovels of the type having a boom and a dipper mounted on the end of a handle which handle is reciprocated with respect to a point on the boom known as the shipper shaft, the dipper being movable on an involute about a roller on said shipper shaft, and in which longitudinal reciprocation of the handle is effected by cables actuated and controlled from the main frame, crowd-out of the dipper handle being effected by reaction of the dipper hoist cable.

In power shovels of the above-described type, especially in the case of shovels with extra long dipper handles, the tension in the dipper hoist cable is usually not alone sufficient to provide a crowd-out force sufficient, when the handle is raised to a maximum height, (1) to hold it against retraction from a fully extended position, or (2) to fully extend it outwardly.

Accordingly a general object of the present invention is to simplify and improve the construction and operation of power shovels of the above-described type, and in particular to provide a novel means by which a loaded dipper may be raised to and held at its maximum height with the dipper handle fully extended, thereby increasing its effective operating range.

A further object is to provide a means whereby reciprocation of the dipper handle may be controlled throughout its range of operating positions regardless whether, in any given position of the handle and any given load, tension in the dipper hoist cable is or is not sufficient to crowd-out the handle.

Further objects and advantages of the present invention will be readily evident as the description progresses.

The invention consists in the novel parts, and in the combinations and arrangements thereof, which are defined in the appended claims, and of which two embodiments are exemplified in the accompanying drawings.

Throughout the description, the same reference number is applied to the same member or to similar members.

FIGURE 6 is an enlarged elevation, partly in section, taken along the line 6—6 of FIGURE 7, of a portion of the means interconnecting the back-haul brake and crowd-out brake of the embodiment of FIGURE 4, and the control linkage therefor.

FIGURE 7 is a plan view, partly in section, of FIGURE 6, taken along the line 7—7.

FIGURE 8 is a vertical view, partly in section, taken along the line 8—8 of FIGURE 6.

Figure 1:
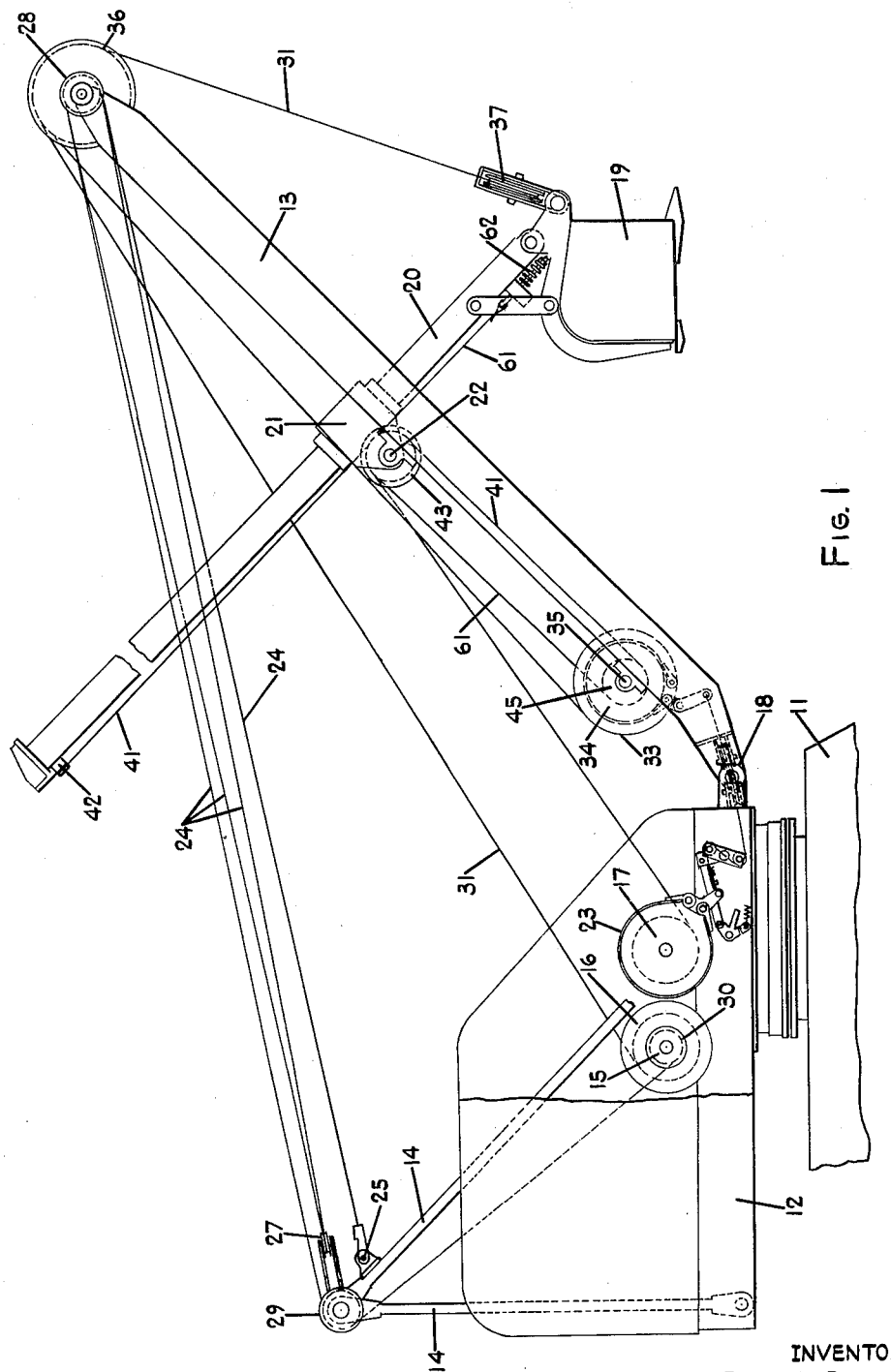
FIGURE 1 is a side elevation of a power shovel illustrating the first embodiment of the invention.
Figure 2:
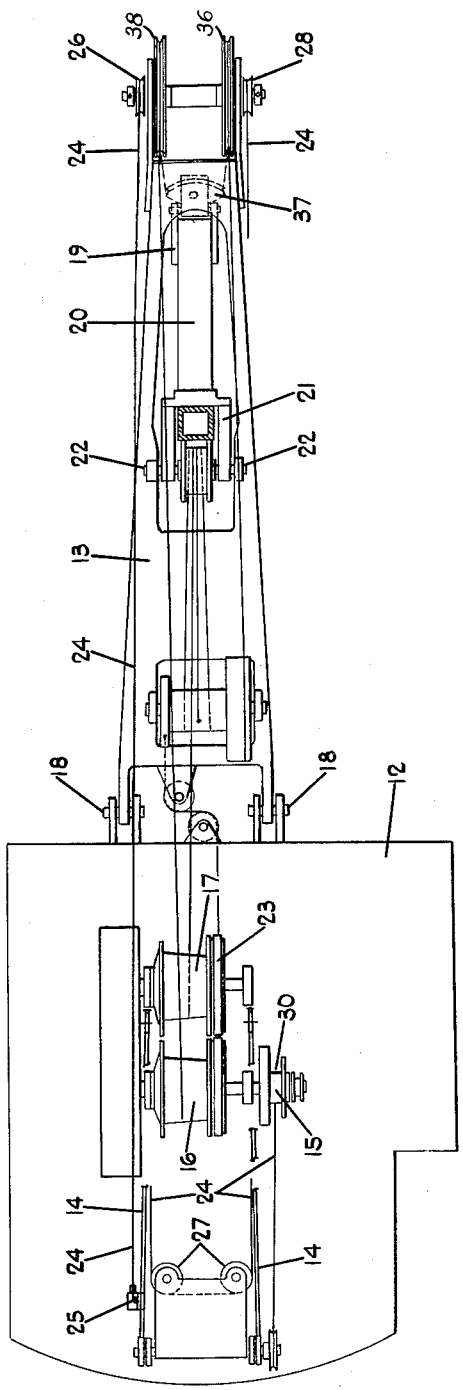
FIGURE 2 is a plan view, partly in section, of the embodiment of FIGURE 1.

Referring to FIGURES 1 and 2, it will be seen that 11 is the main base of a power shovel on which is mounted a revolving main frame 12. This latter supports a boom 13, an A-frame 14, a boom hoist winch 15, a dipper hoist winch 16, and a dipper back-haul winch 17. The boom 13 is pivoted at 18 to revolving main frame 12.

A dipper 19 is carried on the outer end of a handle 20, which reciprocates in saddle block 21 and is capable of tilting about a shipper shaft 22 on which the saddle block is pivoted in any convenient manner.

Each of winches 15, 16 and 17 is rotated by any convenient power source (not shown). Winches 15 and 16 are each provided with a brake (not shown), and with a clutch (not shown), to clutch it to its power source. Back-haul winch 17 is provided with a brake 23 and a clutch (not shown).

Raising and lowering the boom 13 is effected by suitable means such as a cable 24 which is anchored at one end 25 to A-frame 14 and passes thence about boom point sheave 26 (FIGURE 2) at the outer end of boom 13, sheaves 27 on A-frame 14, thence about boom point sheave 28, and thence about sheave 29 on the A-frame to drum 30 of boom hoist winch 15.

Figure 3:
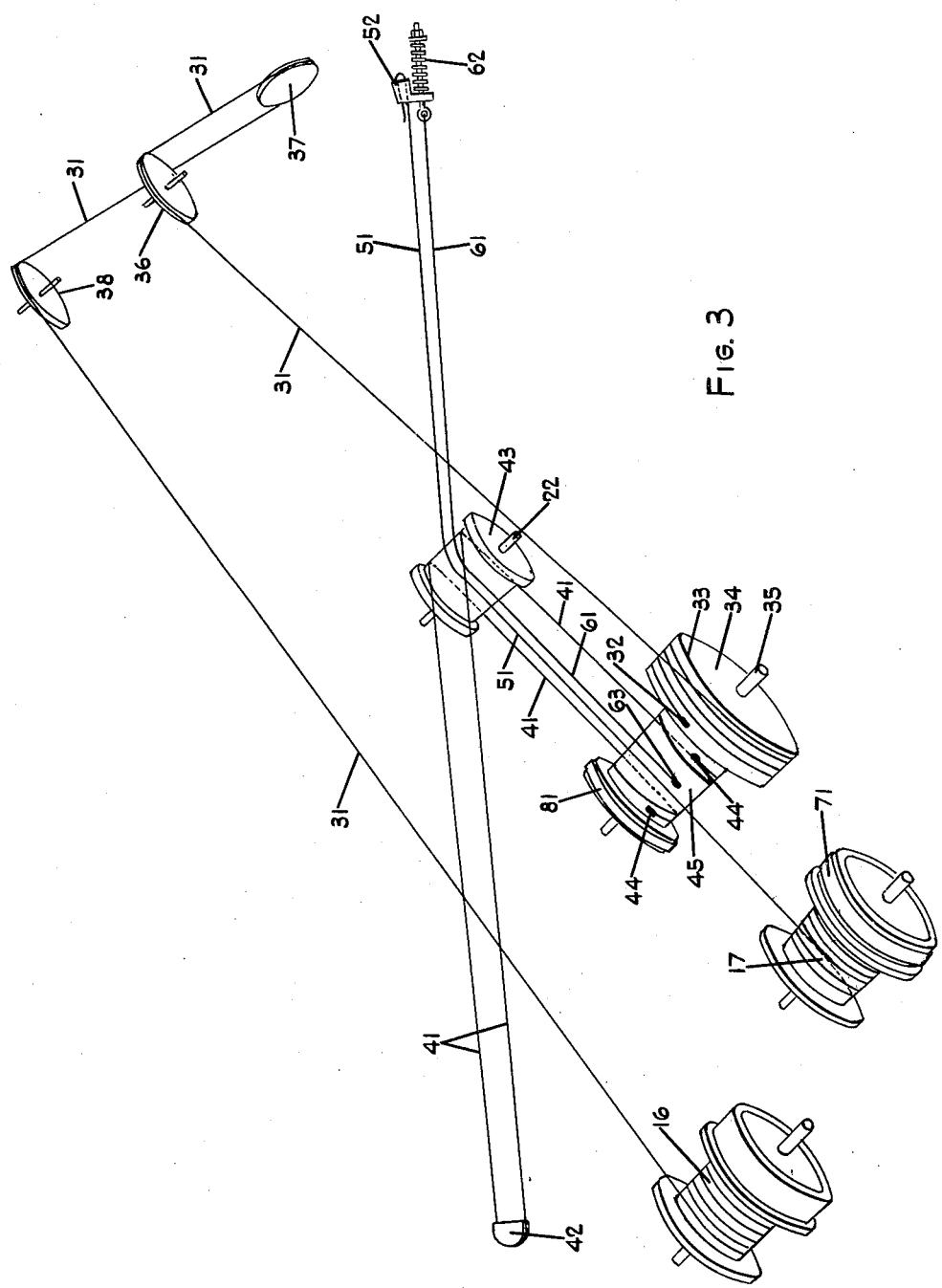
FIGURE 3 is a schematic diagram of the reeving of the dipper hoist, crowd-out and back-haul cables of the embodiment of FIGURE 1.

Hoisting and lowering the dipper is effected by dipper hoist cable 31, which passes from an anchorage 32 (FIGURE 3) on large diameter drum 33 rotatably mounted on shaft 35 supported by boom 13, thence about said drum 33, thence to and over boom point sheave 36 at the outer end of the boom, thence about padlock sheave 37 on dipper 19, over boom-point sheave 38, and thence to dipper hoist winch 16.

Crowd-out of the dipper 19 is effected by dual crowd-out cables 41, each of which passes from an anchorage 42 at the rear end of dipper handle 20, thence over shipper-shaft drum 43 rotatably mounted on shipper shaft 22, and thence to an anchorage 44 on small diameter drum 45 rotatably supported by boom 13, preferably on shaft 35.

Drums 33 and 45 are interconnected to rotate together, preferably about the same shaft and at the same angular speed of rotation. This is accomplished in the first embodiment herein by rigidly interconnecting drums 33 and 45 to form an integral differential drum, generally indicated by the reference numeral 34, rotatably mounted on shaft 35.

Dipper hoist cable 31 and crowd-out cable 41 are oppositely wrapped about their respective drums 33 and 45 of differential drum 34, so that crowd-out cable 41 is actuated by tension in dipper hoist cable 31 to thrust outwardly (i.e., "crowd-out") dipper handle 20. The ratio between the diameters of the large diameter drum 33 and the small diameter drum 45 of differential drum 34 is determined by the desired crowd-out force for a given dipper hoist cable pull which pull is determined by the digging force and the weight of the dipper and handle and the dipper load.

Retraction (i.e., "back-haul") of the dipper is effected by a cable 51 which is anchored to the front end 52 of the handle 20, and passes thence over shipper-shaft drum 43 to back-haul winch 17.

Slack take-up of the crowd-out cable 41 is effected by crowd slack take-up cable 61 which is connected to anchorage 52 on the front end of handle 20 preferably by resilient means, such as compression spring 62, and extends thence over shipper-shaft drum 43 to an anchorage 63 on small diameter drum 45 of differential drum 34, said crowd slack take-up cable 61 being wrapped about said drum 45 oppositely to crowd-out cable 41.

Figure 4:
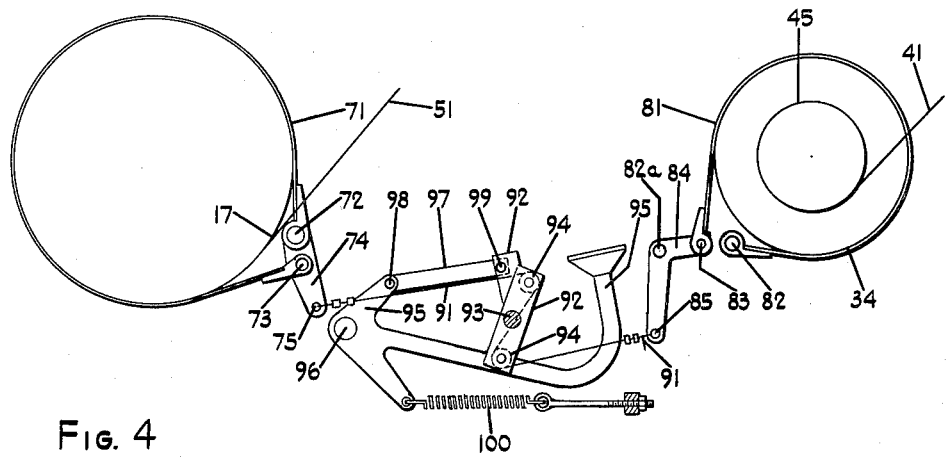
FIGURE 4 is a schematic diagram showing the interlock between the back-haul cable brake and the crowd-out cable brake of the embodiment of FIGURE 1, and the means for controlling same.

Referring now to FIGURES 1 and 4, it is seen that back-haul winch 17 is provided with a brake-band 71 one end of which is dead-ended, as at rock-shaft 72, to main frame 12, while the other live end is secured, as at 73, to brake-lever 74 which is pivoted on main frame 12, as at rock-shaft 72. At its end, as at pin 75, brake-lever 74 is adapted to be moved by brake-actuating means hereinafter described.

Differential drum 34 is provided with a brake-band 81 which is secured at one end, as at rock-shaft 82 to boom 13, while the other live end is secured, as at 83, to brake-lever 84 which is pivoted on boom 13, as at 82a. At its end as at pin 85, lever 84 is adapted to be moved by brake-actuating means hereinafter described.

Referring to FIGURE 4, brake bands 71 and 81 are actuated by a common brake-actuating tension means which includes cable 91 interconnecting the ends 75 and 85 of brake levers 74 and 84 respectively of brake bands 71 and 81, so that the live ends of the two brakes react against each other and the brake-setting force is at all times equalized and applied simultaneously to both brakes.

Referring to FIGURES 4 and 6 to 8 inclusive, the means for tensioning brake-setting cable 91 to apply such equalized brake-setting tension simultaneously to brake bands 71 and 81 comprises a whiffletree bar 92 pivotally mounted, as at pivot 93, on main frame 12, and carrying at opposite ends thereof sheaves 94, about which cable 91 is reeved in such a manner that rotation of the whiffletree bar 92 in one direction (clockwise in FIGURES 4 and 6) will retract the opposite ends of cable 91 simultaneously to set brake bands 71 and 81, and so that rotation of the whiffletree bar in the opposite direction (counterclockwise in FIGURES 4 and 6) will increase the effective length of cable 91 and thereby simultaneously unset said brakes.

Figure 5:
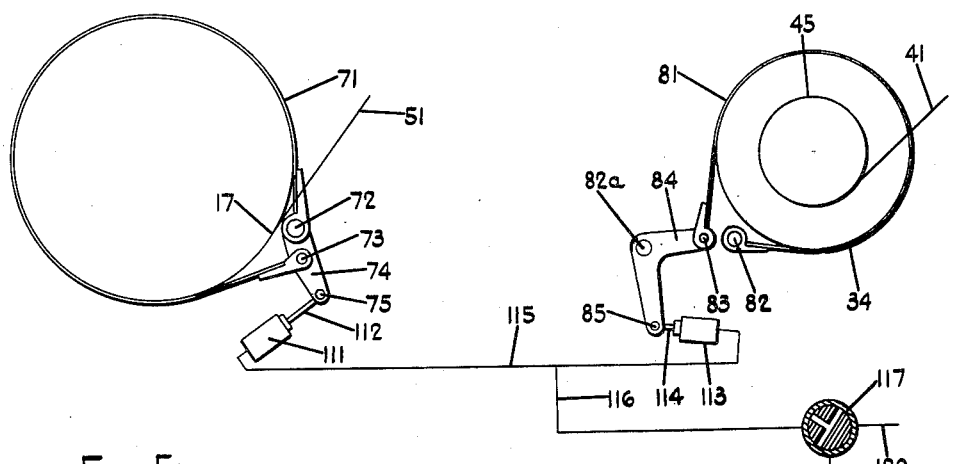
FIGURE 5 is a schematic diagram similar to FIGURE 4, but showing a second embodiment of the brake control means.

Actuation of brake-bands 71 and 81 may be effected by either manual control means (FIGURE 4) or power-control means (FIGURE 5).

Referring to FIGURE 4, it is seen that such manual control means consists preferably of a spring unset brake pedal lever 95 which pivots about brake-shaft 96 on main frame 12 and is pivotally connected to whiffletree bar 92 by link 97, as at pivots 98 nad 99, preferably in such a manner that the clockwise rotation of lever 95 will rotate said whiffletree bar clockwise. Lever 95 is normally biased by spring 100 to rotate counterclockwise to hold the brake bands 71 and 81 in a normally unset position, so that clockwise actuation of brake pedal 96 in opposition to said spring will set the live ends of the brake bands simultaneously.

Figure 5A:
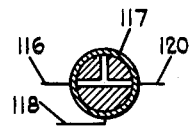
FIGURE 5A is a schematic sectional view of the control valve of the brake control means of FIGURE 5 in brake-release position.
Figure 5B:
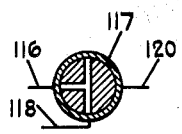
FIGURE 5B is a schematic sectional view of the control valve of the brake control means of FIGURE 5 in brake-set position.

Referring to FIGURE 5, it is seen that an alternative power control means for said brakes may consist of a common fluid pressure actuated system for simultaneously actuating brake levers 74 and 84 to simultaneously set brake bands 71 and 81. In this system brake levers 74 and 84 are respectively adapted to be moved to set said brake bands simultaneously by compression means interconnecting said brake levers and including piston rods 112 and 114 of single-acting cylinders 111 and 113 respectively, which are supplied with pressure fluid (preferably compressed air) from a common conduit 115 connected by supply conduit 116 to a control valve 117. Control valve 117 is supplied with pressure fluid by conduit 118 from pressure fluid chamber 119. When control valve 117 is closed (brake-release position, FIGURE 5A) to block pressure fluid from chamber 119 and to exhaust pressure fluid from cylinders 111 and 113, piston rods 112 and 114 are released and exhaust fluid from the cylinders passes out through exhaust outlet 120. When valve 117 is opened (brake-set position, FIGURE 5B) exhaust outlet 120 is automatically blocked and valve 117 operates to pass pressure fluid from conduit 118 to conduit 116 to actuate both cylinders 111 and 113 simultaneously to set brake bands 71 and 81. In this setting of valve 117, brake bands 71 and 81 are actuated by a common brake-actuating compression means which includes common pressure fluid conduit 115 interconnecting cylinders 111 and 113 which actuate ends 75 and 85 of brake levers 74 and 84 respectively, so that the live ends of the two brakes react against each other and the brake-setting force is at all times equalized and applied simultaneously to both brakes.

The present invention operates as follows. When it is desired to raise the dipper to a maximum height in fully-extended position, in which position the handle retraction component of the weight of the loaded dipper and handle overcomes the dipper-hoist-cable-actuated crowd-out force, so that the dipper handle tends to retract, the operator will initially crowd-out the handle with the dipper in a lowered position until the dipper is approximately fully extended in such lowered position. In this lowered extended position the tension in the hoist cable will be sufficient to crowd-out the handle into such extended position. The operator, with the dipper in such lowered position, will simultaneously set the back-haul and crowd-out brake bands 71 and 81 to hold the handle against reciprocation, and will then actuate the dipper hoist winch 16 to raise the dipper to the desired maximum position, in which it will be held by the setting of the back-haul and crowd-out brakes.

When the operator lowers the dipper from such maximum raised and extended position, the dipper will initially be held against retraction by the crowd-out brake, but at a certain point in the range of lowered positions the handle will tend to crowd-out rather than retract, and this tendency to crowd-out will be prevented by the setting of the back-haul brake. Inasmuch as the back-haul and crowd-out brakes are always set simultaneously as a result of the common equalized brake-setting means, the handle will be held against either crowd-out or retraction throughout its range of positions regardless of whether the handle is at any given position in such range tending to retract or crowd-out. In other words, the operator is assured, without shifting controls, that the dipper handle will be held against crowd-out or retraction, at any given point in the range of dipper positions, even though at such given point he does not known whether the forces on the dipper are such that the dipper will tend to crowd-out or retract.

Having now described and illustrated two forms of the present invention, it is to be understood that the invention is not to be limited to the specific form or arrangement of parts herein described and shown.

What is claimed is:

1. In a power shovel having a main frame, an inclined boom pivotally attached to said main frame, a dipper and dipper handle mounted on said boom to shift and swing relative thereto, the combination of: means for moving said dipper inwardly, including a back-haul winch drum mounted on said frame adjacent said boom pivotal attachment, and a back-haul cable connected to said winch drum and having end-thrust engagement with said dipper handle; means for moving said dipper outwardly, including a hoist winch drum, a first crowd-out drum mounted on said boom, a second crowd-out drum mounted on said boom having an effective diameter greater than the effective diameter of said first crowd-out drum and arranged to rotate with said crowd-out drum, said first and second crowd-out drums being mounted adjacent said boom pivotal attachment, a crowd-out cable connected to and wound upon the first crowd-out drum and having end-thrust engagement with said dipper handle for moving said dipper outwardly, and a hoist cable connected to the hoist winch drum, the boom, the dipper, and the second crowd-out drum, said hoist cable including a hoist line portion extending from said hoist winch drum to said boom and dipper, and a thrust line portion extending from said dipper to said boom and second crowd-out drum in such a direction that tension in said hoist cable will tend through said first and second crowd-out drums and said crowd-out cable to thrust said dipper outwardly; a first brake means mounted on said main frame to brake rotation of said back-haul drum in its back-haul cable pay-out direction; a second brake means mounted on said boom adjacent to said pivotal attachment of said boom to said main frame to brake rotation of said first and second crowd-out drums against rotation permitting crowd-out cable pay-out and hoist cable take-up; and a common brake-actuating means mounted on said main frame to simultaneously and equally set and unset said first and second brake means.

2. The combination of claim 1 wherein said first brake means includes a brake band having one end dead-ended on said main frame against movement in the back-haul cable pay-out direction of rotation of the back-haul drum when said drum pulls the brake band in that direction; that the second brake means includes a brake band having one end dead-ended on said boom against movement in the crowd-out pay-out direction of rotation of the crowd-out drum when said drum pulls the brake band in that direction; and that the common brake-actuating means interconnects the other ends of said brake bands.

References Cited in the file of this patent

UNITED STATES PATENTS

| | | |
|---|---|---|
| 108,366 | Kosinski | Oct. 18, 1870 |
| 1,553,966 | Trotter | Sept. 15, 1925 |
| 2,037,958 | Baker | Apr. 21, 1936 |
| 2,084,449 | Neese | June 22, 1937 |
| 2,380,625 | Zeilman | July 31, 1945 |